Patented Apr. 1, 1947

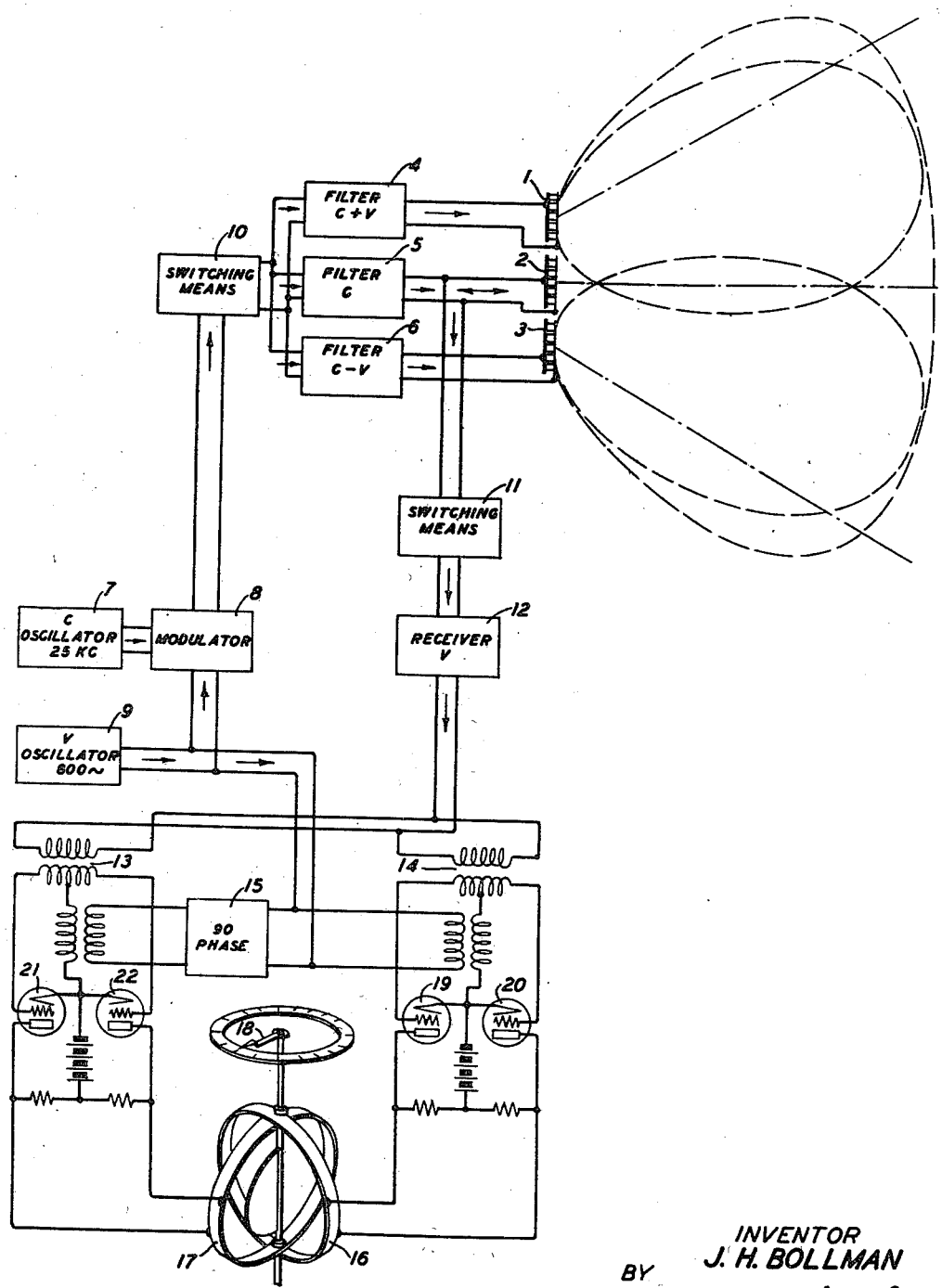

2,418,156

UNITED STATES PATENT OFFICE 2,418,156

DIRECTION FINDING SYSTEM

John H. Bollman, Rutherford, N. J., assignor to Bell Telephone Laboratories, Incorporated, New York, N. Y., a corporation of New York Application April 15, 1943, Serial No. 483,126

6 Claims. (Cl. 177—352)

This invention relates to direction indicators and particularly to means for indicating the direction of a distant target through the employment of the echo of an ultrasonic signal.

The object of the invention is to provide a direct reading direction indicator which will respond to a received ultrasonic signal which is echoed from a distant target. In accordance with the system herein disclosed, a signal consisting of a pulse of alternating current of ultrasonic frequency is transmitted simultaneously with pulses of current of slightly higher and slightly lower frequencies. The three pulses are transmitted by three direction determining projectors so that in effect the higher and lower frequency currents spread out in intensity to either side of the principal frequency. Hence, the echo of the signal will contain three components which differ in amplitude in accordance with the direction of the target with respect to the projectors.

The received echo is then demodulated and converted into an alternating current of a frequency equal to the difference between either side-band frequency and the middle frequency and this current has a substantially constant amplitude or an amplitude independent of the bearing of the target, but of varying phase dependent on the bearing of the target. This current is then modulated with an alternating current from the source used to produce the side-bands with the result that a direct current is produced which bears a direct relation to the bearing of the target.

Since the direct current which gives the wanted indication comes in as recurring pulses, a meter having a restoring torque cannot be used. Hence, a meter of the cross coil wattmeter type or a phase meter is employed. The pointer, after being moved to a particular point under the influence of a pulse through its quadrature coils, remains in that position until moved again by another pulse which will produce a different indication.

A feature of the invention is transducing means for transmitting pulses of ultrasonic frequency of three closely related values, the two extreme frequencies being transmitted in lobes deviating by a given angle from the general direction of the middle frequency. Transducers or projectors are known having a decided directional effect so that the intensity of the transmission therefrom may be represented by a lobe which may be either wide or narrow.

In accordance with the present invention the transmission from that transducer excited by the middle frequency current may be represented by a wide lobe so that the transmission is practically uniform for a wide angle each side of a line normal to the face of the transducer. The other two transducers are each constructed and arranged to transmit in narrowly defined lobes each pointed away from the said normal line. Hence, if a target is on the said normal line, it will reflect a signal from each of the side sources of equal intensity but if it is to one or the other side of said normal line, it will reflect unequal signals from each of the two side sources and the inequality of such reflected signals will be a measure of the bearing of the target.

In accordance with another feature of the invention, a non-restoring meter operated by quadrature coils is employed. The returning echo signal will contain the three frequencies transmitted, but the two extremes being of unequal intensity, will, when combined and demodulated in a receiver, produce an alternating current of low frequency which differs in phase in accordance with the direction of the target. Such alternating current may then be modulated with an alternating current of equal frequency to produce direct currents whose intensity depends on the phase of the said derived alternating current and thus on the direction of the target. This direct current is fed to the quadrature coils of the meter so that the reading of such meter will be an indication of the direction of the target. Since the variable direct current for operating this meter comes in short pulses spaced apart in time by a considerable amount, the needle pointer will remain where last driven after each pulse.

Other features will appear hereinafter.

The drawings consist of a single sheet showing a circuit diagram partly in detail and partly as a schematic block diagram.

There are three transducers 1, 2 and 3 indicated as being connected to the three filters 4, 5 and 6 respectively. Each of these transducers is of conventional design and may consist of an array of piezoelectric crystals arranged in a circuit having a phase shifting network between each crystal whereby a prismatic effect is produced. In accordance with known principles these transducers will transmit any given frequency in a lobe pattern in a given direction in accordance with such frequency. The transducer 1 is represented as transmitting a frequency which may be designated $C+V$ in a sharp lobe pointing upwardly and away from the line normal to the face of the three transducers. Transducer 3 is represented as transmitting a frequency which may be designated $C-V$ in a similar sharp lobe pointing downwardly and equally away from the line normal to the face of the three transducers. Transducer 2 is represented as transmitting a frequency which may be designated as C in a wide-faced lobe pointing directly along the line normal to the face of the three transducers.

The transducers may be energized as follows. The rectangle 7 represents an oscillator or source of current C which by way of example may be 25-kilocycle frequency. The rectangle 9 represents an oscillator or source of current V which by way of example may be 800 cycles. The output C is modulated by the lower frequency current V in the modulator 8 and then fed to the switching means 10 from which it is supplied as wanted to the three filters 4, 5 and 6. Thus what might be termed a carrier and its two side-bands are simultaneously transmitted by the transducers 1, 2 and 3 as corresponding compressional waves. In practice the switching means 10 and the switching means 11 which may be combined in a single system are operated to send out pulses at regular intervals the paths through each being closed alternately.

The reflected signal is received on the wide band transducer 2 which is capable of receiving the returning signal with practically equal facility from any angle. The incoming signal is detected by a receiver 12 and then fed to two modulators where it is modulated by current from the source 9. The current from the source 9 is fed directly to the modulator 14 and through a 90-degree phase shift network 15 to the modulator 13 so that when an impulse is received the quadrature coils 16 and 17 will be properly affected and the pointer 18 will be moved to a corresponding position. Since the meter represented by these quadrature coils 16 and 17 and the pointer 18 has no restoring spring it will remain in the position last set.

Regarding the action of this meter it may be considered that the signal transmitted to the target from the transducer 1 is $$A \cos (C+V)t + a \qquad (1)$$

from the transducer 2 is $$B \cos Ct + b \qquad (2)$$

and from the transducer 3 is $$D \cos (C-V)t + d \qquad (3)$$

where A, B and D are the peak amplitudes of the waves and $a$, $b$ and $d$ are the phase angles thereof.

The received signal will be $$[A \cos (C+V)t+a+\alpha'] + [B \cos Ct+b+\alpha''] + [D \cos (C-V)t+d+\alpha'''] \qquad (4)$$

where the $\alpha$'s are the phase shift due to transmission to and from the target. Passing this signal through a square law detector we have $$([A \cos (C+V)t+a+\alpha'] + [B \cos Ct+b+\alpha''] + [D \cos (C-V)t+d+\alpha'''])^2 \qquad (5)$$

This equation may then be written as equal to $$[A \cos (C+V)t+a+\alpha']^2 + [B \cos Ct+b+\alpha'']^2 + [D \cos (C-V)t+d+\alpha''']^2 + 2AB [\cos (C+V)t+a+\alpha'][\cos Ct+b+\alpha''] + 2BD [\cos (C-V)+d+\alpha'''][\cos Ct+b+\alpha''] + 2AD [\cos (C+V)t+a+\alpha'][\cos (C-V)t+d+\alpha'''] \qquad (6)$$

The first three terms give rise to frequencies of the order of 2C and may be neglected because they are not passed by the selective networks in the receiver. Considering the last three terms separately $$2AB [\cos (C+V)t+a+\alpha'][\cos Ct+b+\alpha''] = AB [\cos (2C+V)t+a+b+\alpha'+\alpha''] + AB [\cos Vt+a-b+\alpha'-\alpha''] \qquad (7)$$

$$2BD [\cos (C-V)t+d+\alpha'''][\cos (Ct+b+\alpha''] = BD [\cos (2C-V)t+b+d+\alpha''+\alpha'''] + BD [\cos (-Vt)+d-b+\alpha'''-\alpha''] \qquad (8)$$

$$2AD [\cos (C-V)t+d+\alpha'][\cos (C+V)t+a+\alpha'''] = AD [\cos 2Ct+a+d+\alpha'+\alpha'''] + AC [\cos (-2Vt)+d-a+\alpha'-\alpha'''] \qquad (9)$$

Since only the last terms of Equations 7 and 8 give components of frequency V, the output of the receiver is $$AB [\cos Vt+a-b+\alpha'-\alpha''] + BD [\cos Vt-d+b-\alpha'''+\alpha''] \qquad (10)$$

Making $a'=a+\alpha'$, $b'=b+\alpha''$, $d'=d+\alpha'''$, this may be written $$AB \cos (a'-b') \cos Vt + BD \cos (b'-d') \cos Vt + AB \sin (a'-b') \sin Vt + BD \sin (b'-d') \sin Vt \qquad (11)$$

from which we derive $$[AB \cos (a'-b') + BD \cos (b'-d')] \cos Vt + [AB \sin (a'-b')] + BD \sin (b'-d') \sin Vt \qquad (12)$$

and this in turn may be rewritten as $$\left( \sqrt{[AB \cos (a'-b') + BD \cos (b'-d')]^2 + [AB \sin(a'-b') + BD \sin(b'-d')]^2} \times \sin Vt + \theta \right) \qquad (13)$$

where $$\theta = \tan^{-1} \frac{[AB \sin (a'-b') + BD \sin (b'-d')]}{[AB \cos (a'-b') + BD \cos (b'-d')]} \qquad (14)$$

assuming $b=0$, then $$\theta = \tan^{-1} \frac{A \sin a - B \sin d}{A \cos a + B \cos d} \qquad (15)$$

This phase angle is the characteristic which is utilized. Since the incoming signal is modulated from the same source as that used to produce the outgoing signal the result will be a direct measurement of the angle of deviation of the target from a line normal to the face of the center transducers 2.

The output of the receiver 12 is a single alternating current of the frequency V and since this is now modulated by a current of the same frequency the output of the two tubes 19 and 20 is a direct current to energize the coil 16 and the output of the two tubes 21 and 22 is a direct current to energize the coil 17, the strength of these two direct currents being related to the shift in phase of the signal due entirely to the position of the target with respect to the line normal to the face of the transducer.

What is claimed is:

1. In a locating system, means for transmitting a plurality of signals each differing from the other in direction and by a small amount in frequency, means for receiving a reflection of said transmitted signals, means for combining and converting said received reflected signals into a single alternating current whose phase with respect to the said transmitted signals is a measure of the bearing of the object from which said signals were reflected, and means responsive to the phase of said alternating current for indicating the said bearing.

2. In a locating system, means for simultaneously transmitting a plurality of signals each of equal intensity and having the phase relationship of a carrier and its sidebands and differing from each other in directional pattern and by a small amount in frequency, means for receiving a reflection of said transmitted signals, means for combining and converting said received reflected signals into a single alternating current whose amplitude is independent of but whose phase with respect to the said transmitted signals is a measure of the bearing of the object from which said signals were reflected, and means responsive to the phase of said alternating current for indicating the said bearing.

3. In a locating system, a plurality of electro-mechanical transducers for simultaneously transmitting a plurality of ultrasonic signals each of equal intensity and having the phase relationship of a carrier and its sidebands and each differing from the other in directional pattern and by a small amount in frequency, means for employing one of said transducers to receive said utrasonic signals after being reflected from an object to be located, means for combining and converting said received reflected signals into a single alternating current whose amplitude is independent of but whose phase with respect to the said transmitted signals is a measure of the bearing of said object, and phase responsive means responsive to said alternating current for indicating said bearing.

4. In a locating system, a plurality of electro-mechanical transducers for simultaneously transmitting a plurality of ultrasonic signals each of equal intensity and having the phase relationship of a carrier and its sidebands and each differing from the other in directional pattern and by a small amount in frequency, means for employing one of said transducers to receive said ultrasonic signals after being reflected from an object to be located, means for combining and converting said received reflected signals into a single alternating current whose amplitude is independent of but whose phase with respect to the said transmitted signals is a measure of the bearing of said object, a source of alternating current of the same frequency as said derived alternating current, modulating means for modulating said derived alternating current by said other source of current to produce direct currents, and direction indicating means operated by said direct currents.

5. In a locating system, a source of high frequency current, a source of low frequency current, a set of electro-mechanical transducers for transmitting ultrasonic signals, a first of the same frequency as said source of high frequency, a second of the frequency of said source of high frequency plus the frequency of said source of low frequency and a third of the frequency of said source of high frequency minus the frequency of said source of low frequency, said signals being of equal intensity, having the phase relationship of a carrier and its sidebands and being transmitted simultaneously, said transducers being constructed and arranged said first to transmit over a wide lobe pointed in a line normal to the common face of said transducers, said second to transmit over a narrow lobe pointed at an angle away from said normal line and said third to transmit over a like narrow lobe pointed at an equal but opposite angle away from said normal line, means for employing the first of said transducers to receive said ultrasonic signals after they have been reflected from an object to be located, means for demodulating said reflected signals to derive a single alternating current of the same frequency as said source of low frequency, said derived current having a phase characteristic with respect to said low frequency current which is a measure of the bearing of said object, and means responsive thereto for indicating the bearing of said object.

6. In a locating system, means for simultaneously transmitting a plurality of signal pulses each of equal intensity, having the phase relationship of a carrier and its sidebands, differing from each other in directional pattern and by a small amount differing in frequency, means for receiving a reflection of said transmitted signals, means for combining and converting said received reflected signals into equal length pulses of a single frequency alternating current whose phase with respect to the said transmitted signals is a function of the bearing of the object from which said signals were reflected, and means responsive to the phase of said derived alternating current for indicating the said bearing, said indicating means being constructed and arranged to maintain the indication produced by a pulse of said current after said pulse has terminated and until changed thereafter by a succeeding pulse of different phase characteristics.

JOHN H. BOLLMAN.

REFERENCES CITED

The following references are of record in the file of this patent:

UNITED STATES PATENTS

| Number | Name | Date |
|---|---|---|
| 2,018,463 | Muchow | Oct. 22, 1935 |
| 2,176,469 | Moueix | Oct. 17, 1939 |
| 2,259,982 | Alexanderson et al. | Oct. 21, 1941 |
| 2,204,438 | Neufeld | June 11, 1940 |